Feb. 12, 1924.

M. E. NESS 1,483,238

TRACTOR ATTACHMENT

Filed Feb. 18, 1922

Inventor
Magnus E. Ness,
By
Attorney

Patented Feb. 12, 1924.

1,483,238

UNITED STATES PATENT OFFICE.

MAGNUS E. NESS, OF STEVINSON, CALIFORNIA.

TRACTOR ATTACHMENT.

Application filed February 18, 1922. Serial No. 537,455.

*To all whom it may concern:*

Be it known that I, MAGNUS E. NESS, a citizen of the United States of America, residing at Stevinson, in the county of Merced and State of California, have invented new and useful Improvements in Tractor Attachments, of which the following is a specification.

The object of the invention is to provide a simple and efficient means in the form of an attachment applicable to conventional forms of tractors, for example of the Fordson type, as a means of holding the clutch in the neutral or disengaged position independently of foot pressure which is ordinarily required as applied to the pedal, and the use of which device provides for allowing the tractor to remain stationary while the engine continues to run, to permit the driver to dismount for the purpose of making an investigation or adjustment, it being a well known fact that with the present construction of tractors of this type the operator is compelled either to stop the engine before dismounting or to tie the clutch pedal in the neutral position with the risk that it may become released and thus permit the tractor to move forward while the operator is engaged in making an adjustment; and with this indicated object in view the invention consists in a construction and combination of parts of which a preferred embodiment is shown in the accompanying drawings, wherein:

Figure 1:
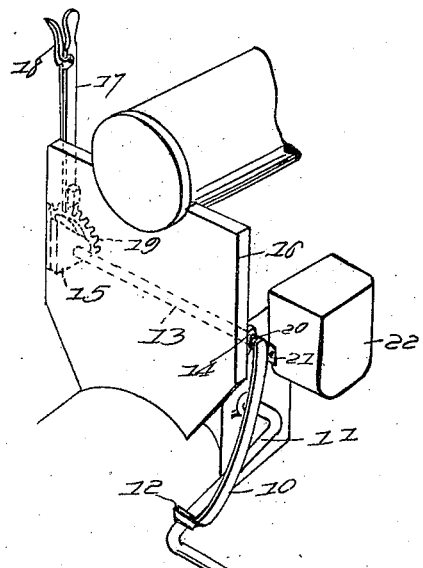
Figure 1 is a perspective view of a clutch pedal holding device embodying the invention applied in the operative position.
Figure 2:
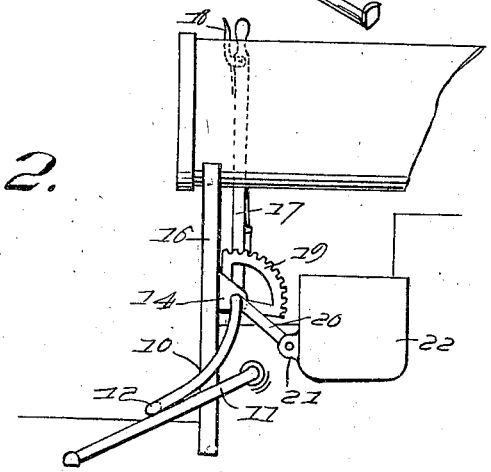
Figure 2 is a side view of the same.

The device consists essentially of a holding arm 10 which is mounted for swinging movement in the plane of or parallel with that of the clutch pedal 11 and is provided with a shoe 12 adapted to bear upon the clutch pedal arm, together with means for securing said holding arm in adjusted positions and particularly in a position in which it is adapted as indicated in the drawing to hold the clutch pedal in its depressed or neutral position with the clutch inoperative.

In the construction illustrated the holding arm is carried by a shaft 13 mounted in bearing brackets 14 and 15 adapted to be bolted or otherwise conventionally attached to the dash board 16 of the tractor (or to any other convenient portion of the frame of the tractor so located as to properly position the holding arm) a hand lever 17 being carried by said spindle at the opposite end from the holding arm and carrying a latch 18 for engagement with a toothed segment 19 which may be secured to or formed as a part of the bracket 15.

As a means of strengthening the mounting of the attachment a brace 20 may be extended from the spindle 13 to an ear 21 which is ordinarily found on the gasoline tank 22 of a tractor of the Fordson type.

Obviously it is only necessary, in order to lock the clutch pedal in neutral position to move the hand lever 17 forward and lock it with the holding arm 10 in contact with the depressed pedal arm 11 as shown in the drawings, whereupon without stopping the engine the operator is free to dismount and attend to such matters as may be deemed necessary in reference to the adjustment of the tractor or of the arrangement of the agricultural implement or machine which is being operated thereby. The disengagement of the hand lever and return thereof to its normal position leaves the clutch pedal free for operation in the ordinary way.

Having described the invention, what is claimed as new and useful is:—

The combination with a tractor having a clutch pedal and a dash, of a transverse shaft, bearing brackets mounted on the forward wall of the dash and supporting said shaft for rocking movement, a holding arm carried by the shaft at one extremity and provided with a terminal shoe for engagement with the clutch pedal arm to hold the same depressed, a lever mounted at the opposite extremity of the shaft and provided with a latch, and a segment carried by one of the bearing brackets and adapted for engagement by said latch.

In testimony whereof he affixes his signature.

MAGNUS E. NESS.